United States Patent
Kehrer et al.

(10) Patent No.: US 6,611,723 B1
(45) Date of Patent: Aug. 26, 2003

(54) DEVICE AND METHOD FOR MONITORING THE RUNNING OF PROCESSES IN A DIGITAL COMPUTER

(75) Inventors: Gerd Kehrer, Meckenheim (DE); Thomas Prause, Niederschoena (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,871

(22) Filed: Jan. 21, 2000

(30) Foreign Application Priority Data

Mar. 16, 1999 (DE) .......................... 199 11 759

(51) Int. Cl.⁷ .............................. G06F 11/30
(52) U.S. Cl. .................. 700/26; 700/21; 700/82; 702/183; 702/187
(58) Field of Search .................. 700/21, 23, 26, 700/28, 79, 82; 702/182, 183, 185, 187; 714/46, 47, 48

(56) References Cited

U.S. PATENT DOCUMENTS

| | | | | |
|---|---|---|---|---|
| 5,752,002 A | * | 5/1998 | Naidu et al. | 395/500 |
| 5,852,713 A | * | 12/1998 | Shannon | 395/182.04 |
| 6,101,497 A | * | 8/2000 | Ofek | 707/10 |
| 6,148,412 A | * | 11/2000 | Cannon et al. | 714/6 |

FOREIGN PATENT DOCUMENTS

| | | | | |
|---|---|---|---|---|
| DE | 4204113 | | 3/1993 | G06F 11/34 |
| EP | 0790559 | | 8/1997 | G06F 11/34 |

* cited by examiner

*Primary Examiner*—Paul P. Gordon
(74) *Attorney, Agent, or Firm*—Gerald R. Woods (57) ABSTRACT

The invention relates to a device and a method for run monitoring of processes in a digital computer. In accordance with the present invention, time-stamped analysis data are manipulated such that the analysis data can be output in a freely selectable time sequence and at a freely selectable rate. This enables user-friendly run monitoring of backup operations.

4 Claims, 9 Drawing Sheets

DEVICE AND METHOD FOR MONITORING THE RUNNING OF PROCESSES IN A DIGITAL COMPUTER

FIELD OF THE INVENTION

The invention relates to a device and a method for run monitoring of processes in a digital computer.

BACKGROUND OF THE INVENTION

For run monitoring of processes in digital computers, for example by a system administrator, it is necessary to observe the system processes in the digital computer. During execution of processes in digital computers a variety of information, such as the time progression and any errors or irregularities, is stored in log files of the various components of the computer system. In a subsequent run analysis of a process, information is read from those log files and manually evaluated. To enable this, access to all systems involved in the monitored process must firstly be provided, which may impair the security of the systems. Secondly, targeting the location of individual items of information relating to the process is extremely involved and time-consuming, since the contents of the log files must be placed in relation to each other, the log files are usually very extensive and are usually stored in a text data format, and also contain additional information which is not necessary for a run analysis of the process.

The object of the present invention is to provide a method and a device for user-friendly run monitoring of processes in a digital computer.

SUMMARY OF THE INVENTION

One advantage of the present invention is that a run analysis of a monitored process can be undertaken both during the run itself and subsequently. Since information is converged from several different sources in doing so, manual linking of information concerning the process is no longer necessary. Since, furthermore, only such information is selected and processed as is relevant to the analysis, manual selection and processing of relevant information is no longer necessary. A further advantage is that the present invention permits any desired access to the analysis data in subsequent run analysis of a process. By means of various methods of accessing the analysis data, such as forward and backward review and fast motion and slow motion, an additionally user-friendly means of analysis is created. The implementation of the analysis system independent of the system under analysis (test system) enables safeguarded run monitoring because, firstly, no additional components need to be installed on the test system and, secondly, access is only required to the analysis system. This is especially advantageous where the test system controls critical processes and the installation of additional components is not possible because of the risk of a system failure. By separating the test system and analysis system, unnecessary consumption of memory and computing power capacity in the test system is avoided. A further advantage is that the relevant analysis data delivered by the present invention can be separated from the analysis system and can be sent to a different location, such as to an expert analyst, for evaluation.

The invention is described in more detail in the following on the basis of preferred embodiments.

DESCRIPTION OF THE PREFERRED EMBODIMENTS

Figure 1:
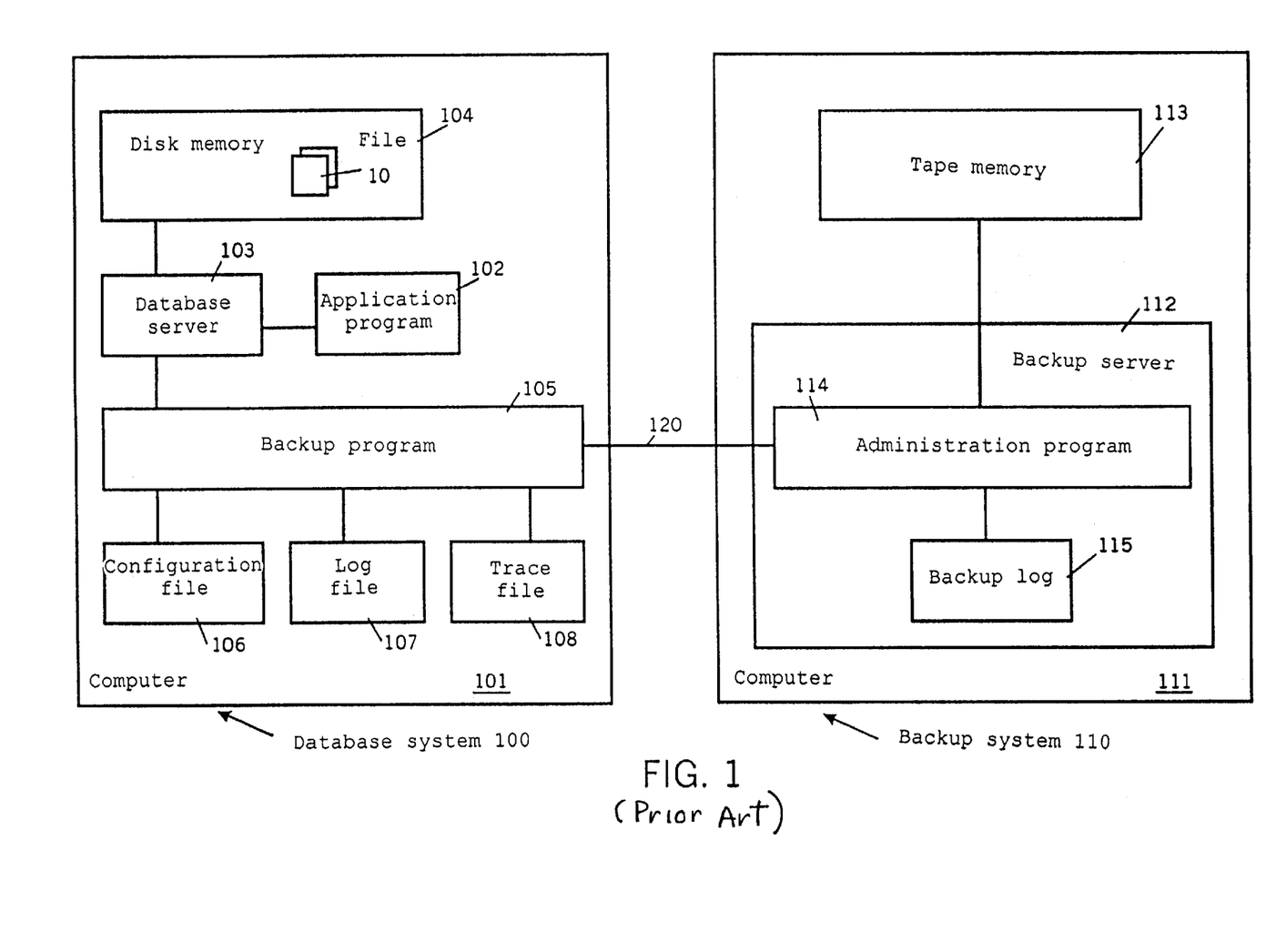
FIG. 1 shows a schematic view of a backup system based on the state of the art.

To back up data in computer systems, for example to protect against physical destruction, backup copies are created on a regular basis in an additional memory area or on an additional data carrier. FIG. 1 show a schematic view of a conventional backup system. It includes a computer 101D in a system 100 having data to be backed-up, and a computer 111 in a backup system 110.

On the computer 101 there is an application program 102 which, for example, controls critical corporate processes. For data management in this system a database application 103 is used. The system here is a client/server system in which the application program 102 represents the database client and the database application 103 represents the database server. The data to be managed by the database application 103 are stored in the form of files 10 in database memories 104, in this case disk memories.

In addition to the application program 102 and the database application 103, the main memory of the computer 101 also includes a backup program 105 as a third process, which provides an interface to connect the database application 103 to the backup system 110.

Configuration parameters of the backup program 105, such as the address of the backup server 112, the size of the data blocks to be read-in in a backup operation or the maximum number of files 10 to be edited simultaneously are stored in a configuration file 106 and can be read by the backup program 105.

In the course of the backup operation the names of the backed-up files 10 are recorded together with the start and end time of the backup operation of each individual file 10, and written in ASCII format to a log file 107 together with other information, such as database configuration data.

The steps executed by the backup program 105 during a backup operation are logged together with other information, such as transmission errors in the network 120, in a trace file 108.

For the backup operation, the file 10 to be backed-up is opened by the backup program 105. Then the file 10 is read block-by-block from the disk memory 104 into the main memory of the computer 101. These data blocks are then sent by the backup program 105 to the backup system 110 including computer 111. This is effected over a computer network 120 which may, for example, be a TCP/IP or NETBIOS network. The backup program 105 is able to back-up several files 10 simultaneously.

The backup system 110 comprises a backup server 112 and data memory 113, here a tape memory, in which the data sent by the backup program 105 are stored as backup copies. In this, the backup program 105 on the computer 101—the backup client —and the backup server 112 on the computer 111 form a client/server system. The backup server 112 comprises a program 114 to manage the backup data on the backup server 112. It holds information on the backup operation, such as its progress and/or which backup data are located on which tape memories 113, in a backup log 115.

Figure 2:
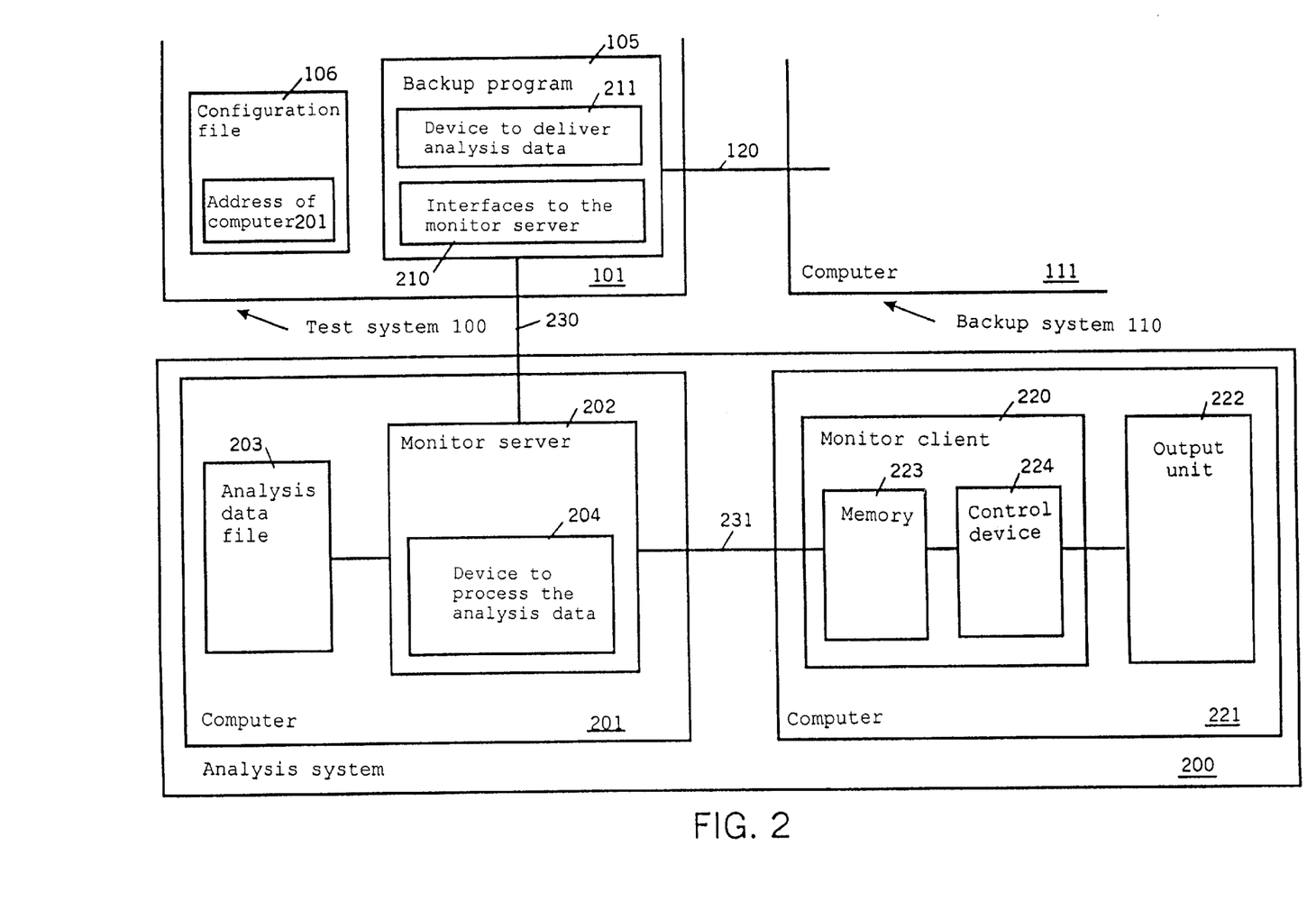
FIG. 2 shows a schematic view of a backup system with analysis system.

FIG. 2 shows the schematic view of a backup system based on a preferred embodiment of the present invention. In addition to the system 100 with the data to be backed-up (test system 100, only partially shown) and the backup system 110 (only partially shown) from FIG. 1, the invention also comprises an additional analysis system 200. In accordance with the present invention, the analysis system 200 and the test system 100 are preferably on different computers.

The backup program 105 includes an additional external interface 210 to the analysis system 200. By way of this interface 210, analysis data are passed to the analysis system 200. The link between the computer 101 and the computer 201 required for this is preferably a standard TCP/IP socket connection 230.

The analysis data being transferred comprise general information on the backup operation as well as special information relating to execution of the backup operation. This information is transmitted by the backup program preferentially in the form of data packets. Preferred embodiments of these data packets are shown in FIG. 3 and FIG. 4.

Figure 3:
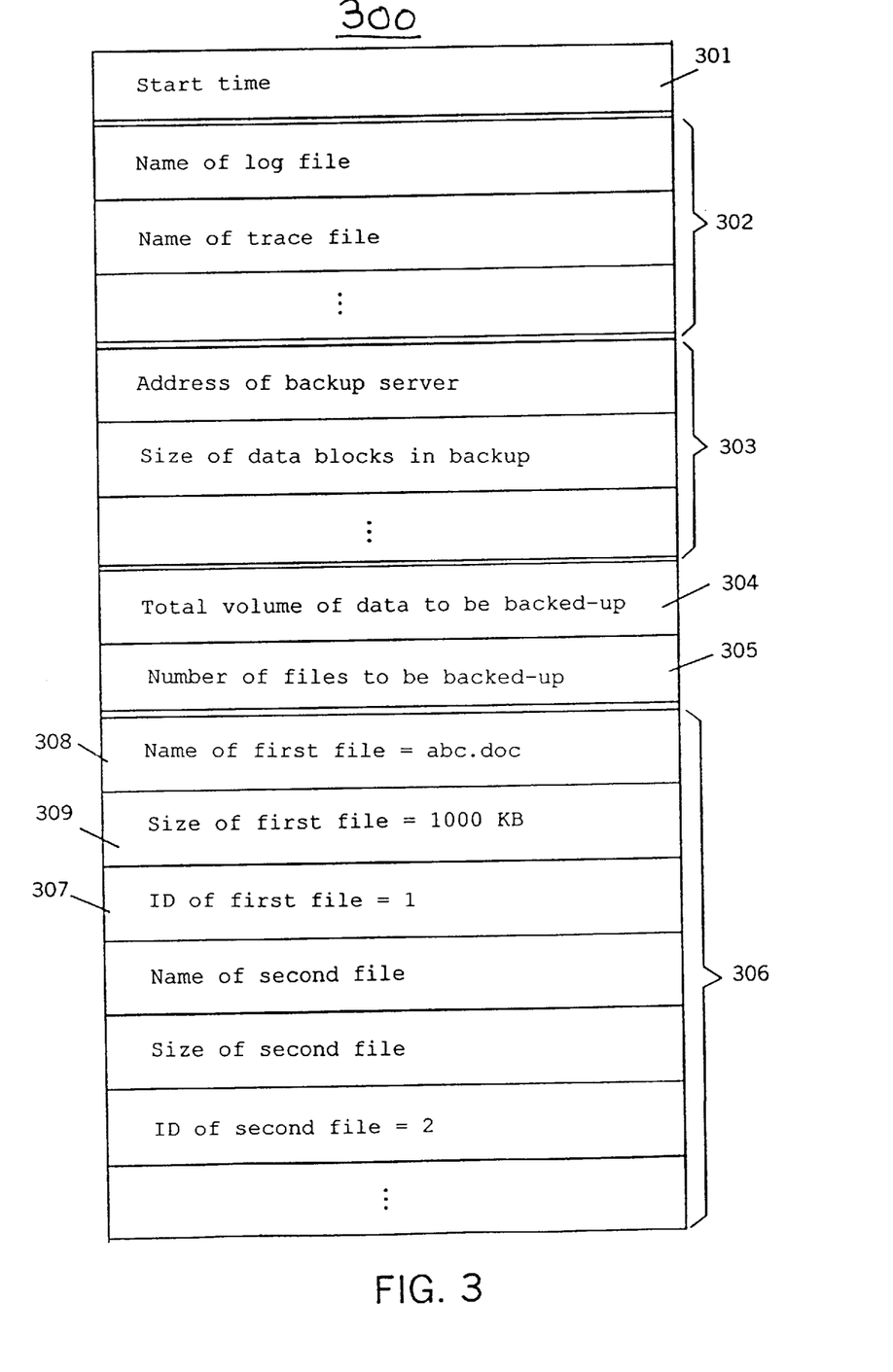
FIG. 3 shows a schematic view of first analysis data.
Figure 4:
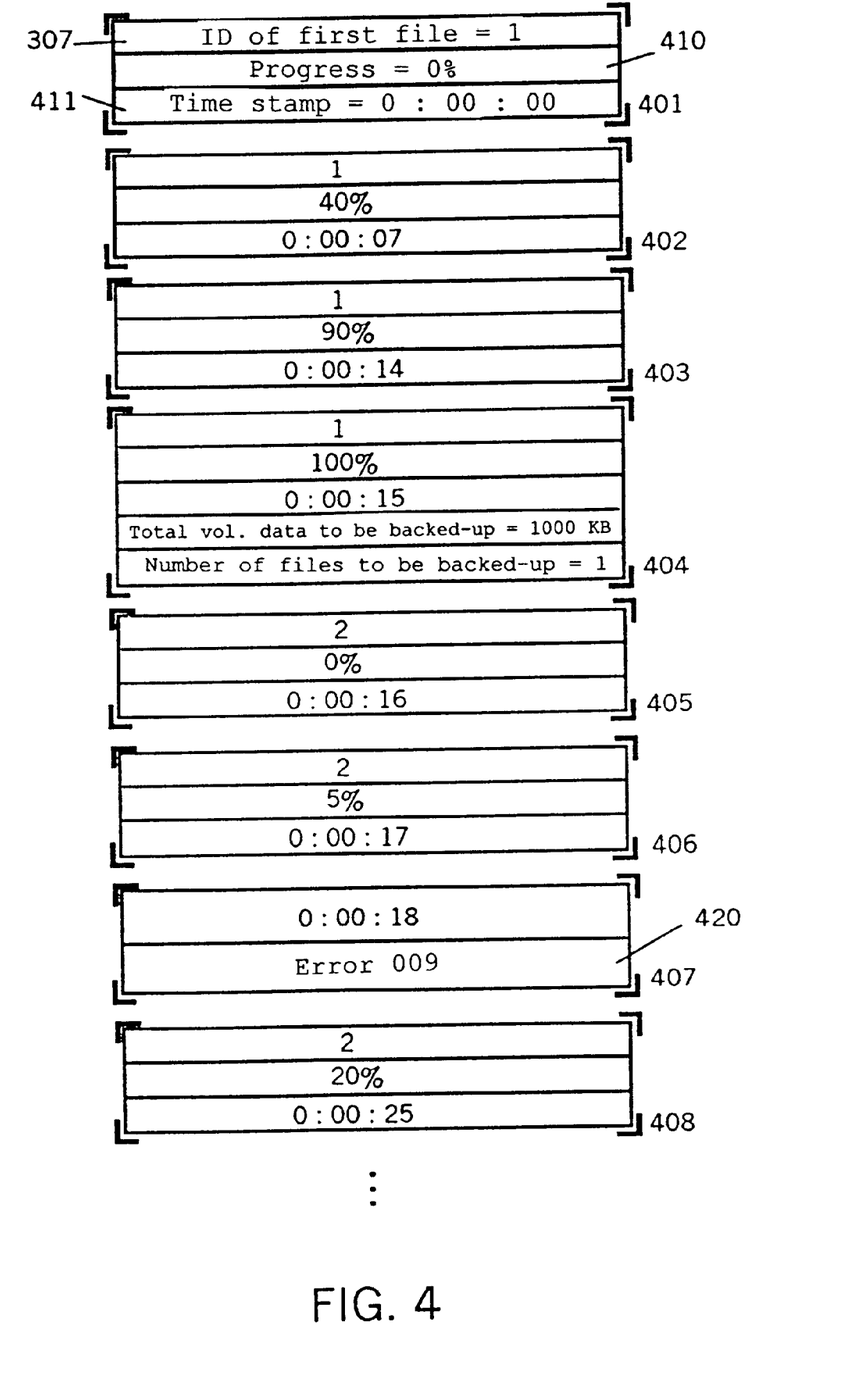
FIG. 4 shows a schematic view of second analysis data.

FIG. 3 shows a first packet 300 for transporting general information on the backup operation. In addition to the start time 301 of the backup operation, the general information comprises information 302 for unique allocation of the trace file 108, log file 107 and backup log 115 to a backup operation, for example their names. It also includes selected configuration parameters 303 from the configuration file 106, the total volume 304 of data to be saved, the number 305 of files 10 to be backed-up, and a list 306 of the files 10 to be backed-up during the current backup. As shown, the list 306 contains the name 308 and file size 309 of each file 10 as well as a numerical identifier (ID) 307 which uniquely identifies every file 10 being backed-up. This permits a reduction in the volume of data to be transmitted, since in the subsequent transmission of the packets with the latest analysis data to the analysis system 200 the complete file name 308 of the files 10 concerned no longer needs to be transmitted, only the identifier 307.

The special information relating to execution of the backup operation is preferentially compiled into several packets, which are transmitted according to the progress of the backup operation to the monitor server. FIG. 4 shows a segment of these data packets in a possible sequence.

A first packet form 401, 402, . . . , 406, 408 comprises information 410 on the progress of the backup operation for each individual file 10, for example as a percentage, with each such item of information being assigned a time stamp 411. In this way the start and end time of the backup operation for each individual file 10 is recorded. The time stamp 411 at the end of the backup operation of the last file 10 shows the end time of the overall backup operation. A second packet form 407 comprises error messages 420, preferentially as error codes and/or in plain text, and warnings 420 of irregularities in the course of the backup operation such as network failures, with such events also being assigned a time stamp 411.

Where the backup program 105 backs up several files 10 simultaneously, the analysis data additionally contain relevant information concerning the number of started agents as well as information enabling unique allocation of each file 10 being backed-up to the process responsible for the backup.

Before these analysis data can be transmitted, they are delivered by the backup program 105. For this purpose the backup program has a device 211 to deliver the analysis data, as shown in FIG. 2. The device 211 collates all necessary information, after requesting the information where necessary, and passes it to the additional external interface 210, after time-stamping device 211 where necessary. It also generates the information 410 on the progress of the backup operation for each individual file 10 by generating a corresponding value after reading-in each block from the disk memory 104 to the main memory of the computer 101.

The analysis system 200 comprises a monitor server 202 and at least one monitor client 220, which form a client/server system here. In this, the analysis system 200 may be located on any one or more computers in the network. The monitor server 202 is preferentially located on a computer 201 and the monitor-Client 220 on a computer 221. Both are connected by a standard TCP/IP socket connection 231. The monitor client 220 and monitor server 202 may, however, also be located on one common computer.

The monitor server 202 may contain analysis data from several backup programs 105, and also be linked to several monitor clients 220.

The monitor client 220 is linked to an output unit 222 which is preferably a monitor with a graphical user interface.

In the preferred embodiment of the invention the connection 230 between the computer 101 and the computer 201 is made when the backup program 105 starts and is maintained until the end of the backup process. In a further embodiment of the invention, the connection 230 is a permanent connection which exists independently of any backup operation in progress. The socket connection 230 is initialized by a standard command to TCP/IP standard, in which the address of the computer 201 located as a new configuration parameter in the configuration file 106 is read from there by the backup program 105.

Figure 5:
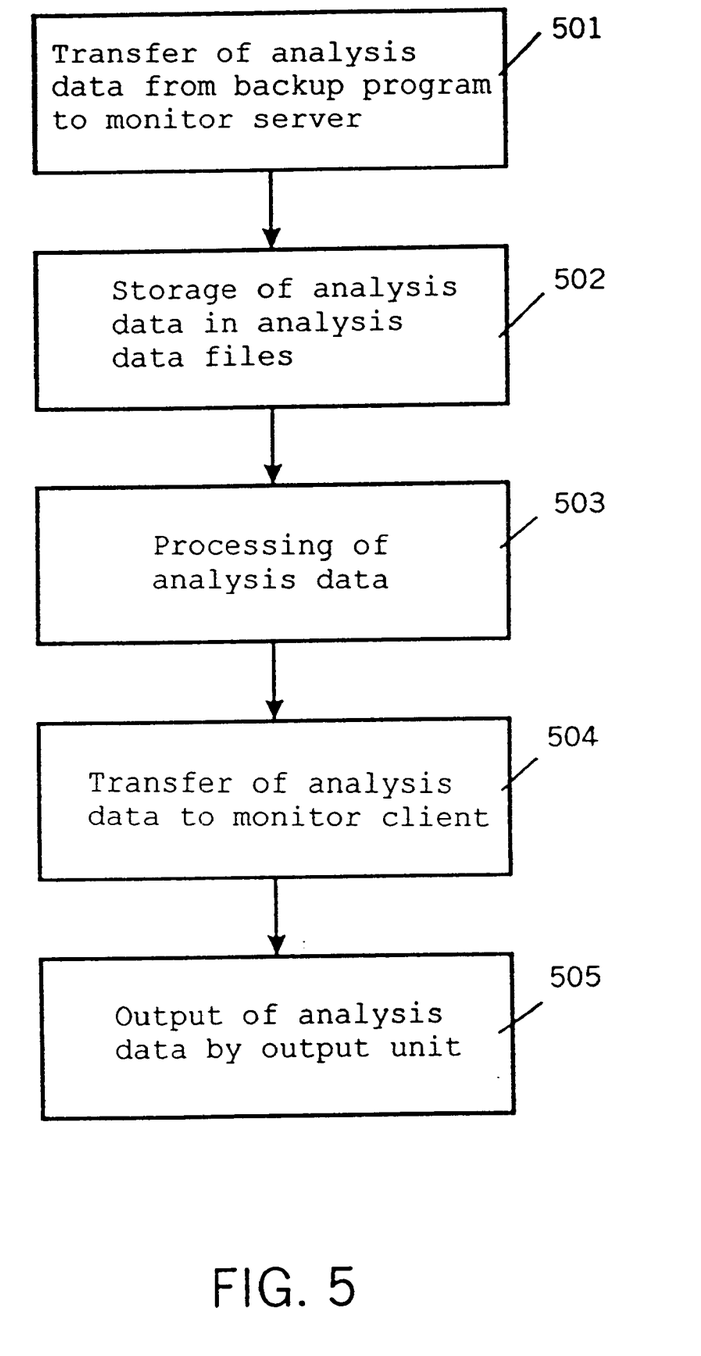
FIG. 5 shows the sequence of a run monitoring process during the backup operation.

FIG. 5 shows the sequence of the run monitoring of the backup operation during execution of the backup operation. As shown here, in step 501, after the start of the backup operation and with a live connection 230 between the computer 101 and the computer 201, analysis data are transferred by the backup program 105 to the monitor server 202. In the process the analysis data are transferred in data packets 300, 401, 402, . . . , 408, wherein information not dependent on the progression of the backup operation is preferably transferred first, for example in the form of a packet 300 as shown in FIG. 3. Then, according to the block-by-block progression of the backup operation in the computer 101, the progress-specific information for each individual file 10 is progressively transferred, for example in succession the packets 401, 402, . . . , 408, . . ., as shown in FIG. 4.

In the monitor server 202 these analysis data are stored in an analysis data file 203, as shown in FIG. 2—step 502. For each backup operation, i.e. for each backup of a specific data set, an analysis data file 203 of this kind is created, preferably in a mass storage device such as a hard disk, by the monitor server 202. The analysis data are preferably stored in the analysis data file 203 in their original state, in order to avoid loss of data.

In a next step 503 the analysis data are processed by a device 204 for processing of the analysis data. The device 204 is preferably located in the monitor server 202. The data processing may, however, also be performed by a corresponding device 204 in the monitor client 220. In processing of the analysis data the data are converted into an optimum form for later representation, such as in graphical form. This may, for example, involve selection of relevant data from a data record as unformatted text and creation of a corresponding table including the selected data. Other information is also calculated here, such as the backup data transfer rate, preferably in Mbytes per second or Gbytes per hour, from the file size information 309 and the relevant time stamps 411.

After processing of the analysis data, in step 504 the data passed to the monitor client 220 and stored there in the memory 223.

Where a connection exists between the monitor server 202 and the monitor client 220, and the monitor client 220 has logged on to the monitor server 202, when logging on the monitor client 220 a notification of whether a backup operation is taking place or not.

If a backup operation is taking place at the time, the analysis data are transferred to the output unit 222 and delivered there in step 505. It is of no consequence whether the monitor client is started precisely when the backup operation is started or not until the backup operation is already running. In any case, the latest status of the analysis data is transferred to the output unit 222.

It should be pointed out at this juncture that steps 501 to 505 are repeated when backing-up each block of a file 10 being backed-up. This means that during the backup operation the analysis data are progressively passed to the monitor client 220, and thus to the output unit 222, in quasi real-time mode.

Figure 10:
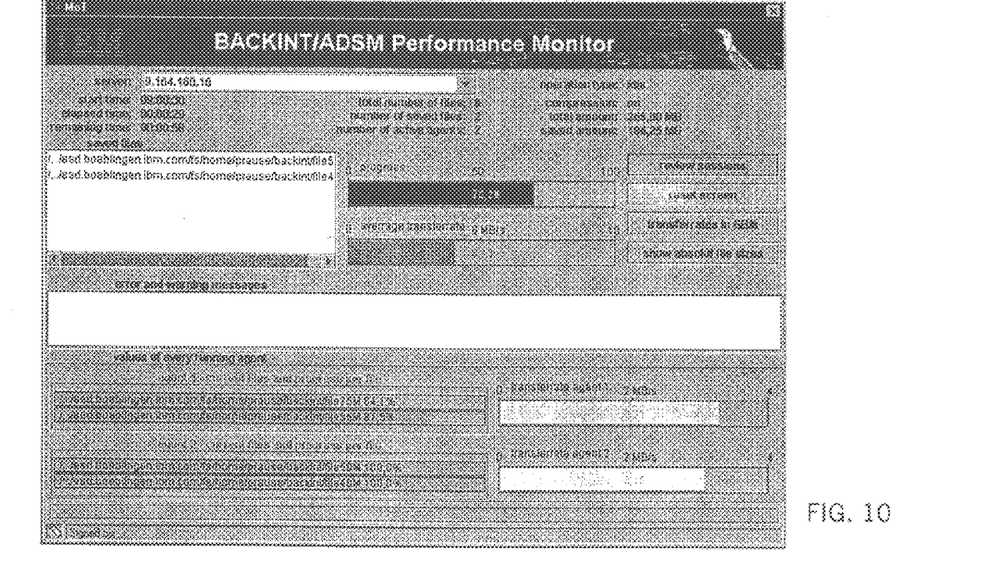
FIG. 10 shows a screenshot of a graphical user interface for backup analysis.

The output unit 222 is, preferably a monitor with graphical user interface, as shown in FIG. 10. Among other items of data, the information transferred in packets 300, 401, 402, . . . , 408, as well as information calculated from it such as the backup data transfer rates, is displayed. The display is preferably in graphical form.

Instead of to the output unit 222, the analysis data may however also be written to a file, located in the computer 221 for example, after which the backup operation can be passed to another computer system so that a backup analysis can also be performed at another location.

Figure 8:
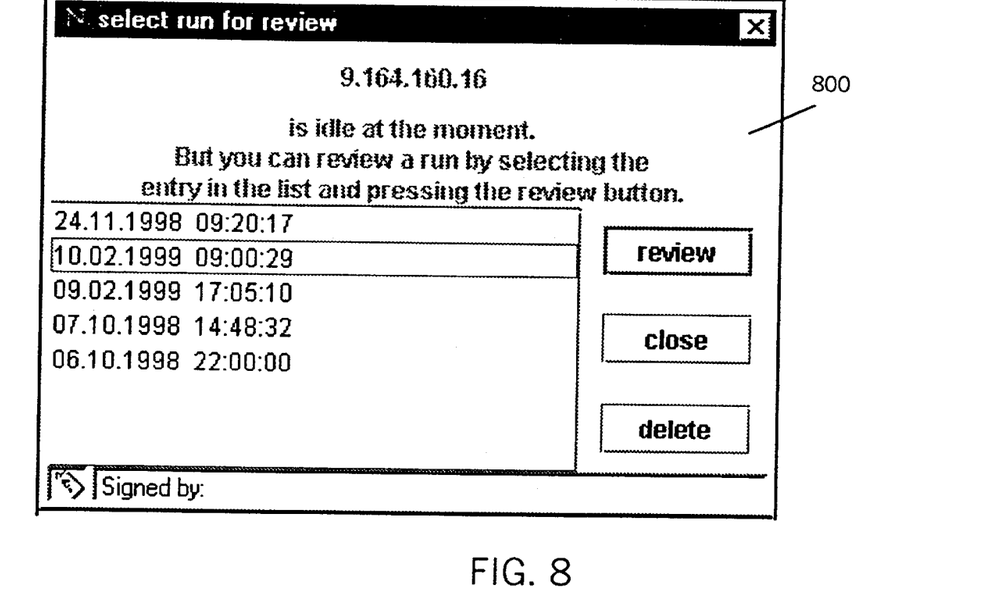
FIG. 8 shows a screenshot of a graphical user interface for selection of earlier backup operations.

If no backup operation is taking place when the monitor client 220 starts, a selection list 800 of earlier backup operations is delivered to the monitor client 220. A selection list 800 of this kind is shown in FIG. 8. The user can select from the selection list 800 an earlier backup operation for subsequent run analysis.

The following section describes the sequence of the method for subsequent review of the analysis data.

Figure 6:
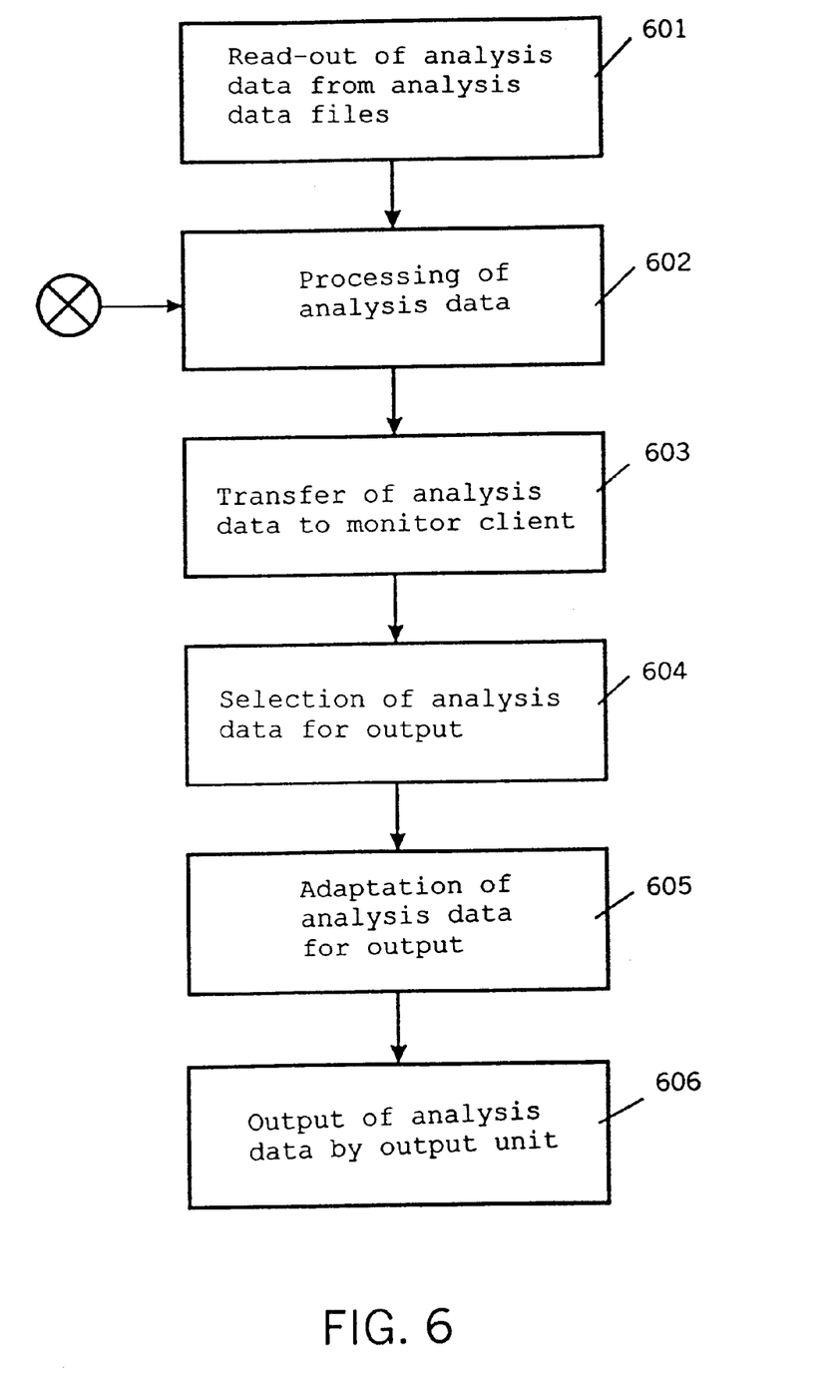
FIG. 6 shows the sequence of a run monitoring process after a backup operation.

As shown in FIG. 6, in step 601 the analysis data are read from the relevant analysis data file 203 by the monitor server 202 according to the selection made by the user from the selection list 800. Then, in step 602, the analysis data are processed in the device 204 as described above. Then the entire set of analysis data of the selected backup operation in the form of analysis data file 203 is transferred to the monitor client 220 and stored there in the memory 223 in step 603. The memory 223 is preferably the main memory of the monitor client 220.

Then in step 604, according to a selection by the user, preferentially by way of a graphical user interface, analysis data are selected for output. The selected analysis data are read from the analysis data file 203 in the memory 223 of the monitor client 220 by a control device 224 as shown in FIG. 2. Users can adapt the display of the analysis data to their own requirements. To this end, users can influence the display of the analysis data by means of the graphical user interface. In step 605 the control device 224 prepares the read analysis data for output based on those user settings.

Figure 9:
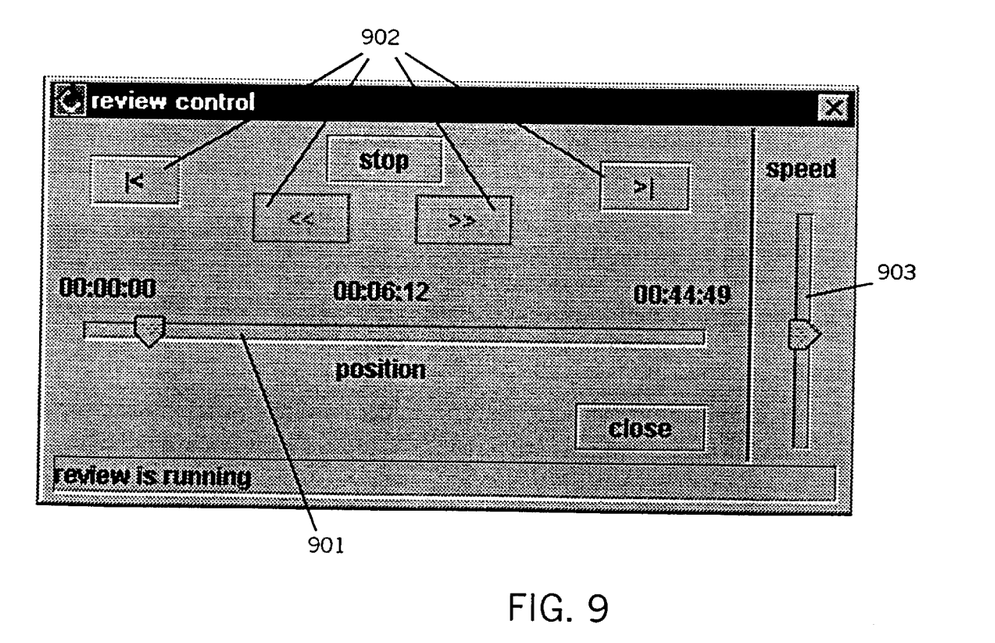
FIG. 9 shows a screenshot of a graphical user interface to control review of the analysis data.

A view of part of the graphical user interface to control the control device 224 is shown in FIG. 9. In this, the time can be set for which, or as from which, the analysis data are to be displayed, for example by means of a position slide control 901. The default output of the analysis data is from the start time of the backup operation, and at the original rate of the backup process (run mode). However, analysis data can also be displayed for a specific point in time (stop mode). Users can also define that output of the analysis data does not begin from the start time of the backup operation, but only as from a later point in the backup operation. By operating the relevant control elements 902, the user also has the facility to view the analysis data in forward or reverse sequence. The user can also regulate the rate of output of the analysis data, for example with a sliding speed control 903. The rate of output of the analysis data can be reduced or increased, resulting in a slow-motion or fast-motion view of the analysis data.

When the control device 224 has read the analysis data from the memory 223 according to the user's settings and processed them in steps 604 and 605 respectively, it transfers the analysis data to the output unit 222, where they are delivered according to the user's settings made in step 606.

The analysis data are delivered as if the backup operation was taking place. The user can also access any point in time in the backup operation, jump to any time in the backup operation, and alter the rate of display of the analysis data. As described above, the analysis data output is preferably to a monitor, as shown in FIG. 10.

The user can view any possible errors or irregularities which may have occurred from the error messages and warnings 420 which, together with an assigned time stamp 411, are transferred as analysis data. If the user detects such an event—for example a fall in the backup data transfer rate—in the course of the backup operation at a specific point in time, he can produce more detailed analysis data additional to the analysis data output up to that point.

These additional items of analysis data provide detailed information on the backup operation which is stored in the log file 107 and/or the trace file 108 of the test system 100 and/or in the backup log 115 of the backup system 110, and which can give indications of the causes of errors or irregularities during the backup operation.

Figure 7:
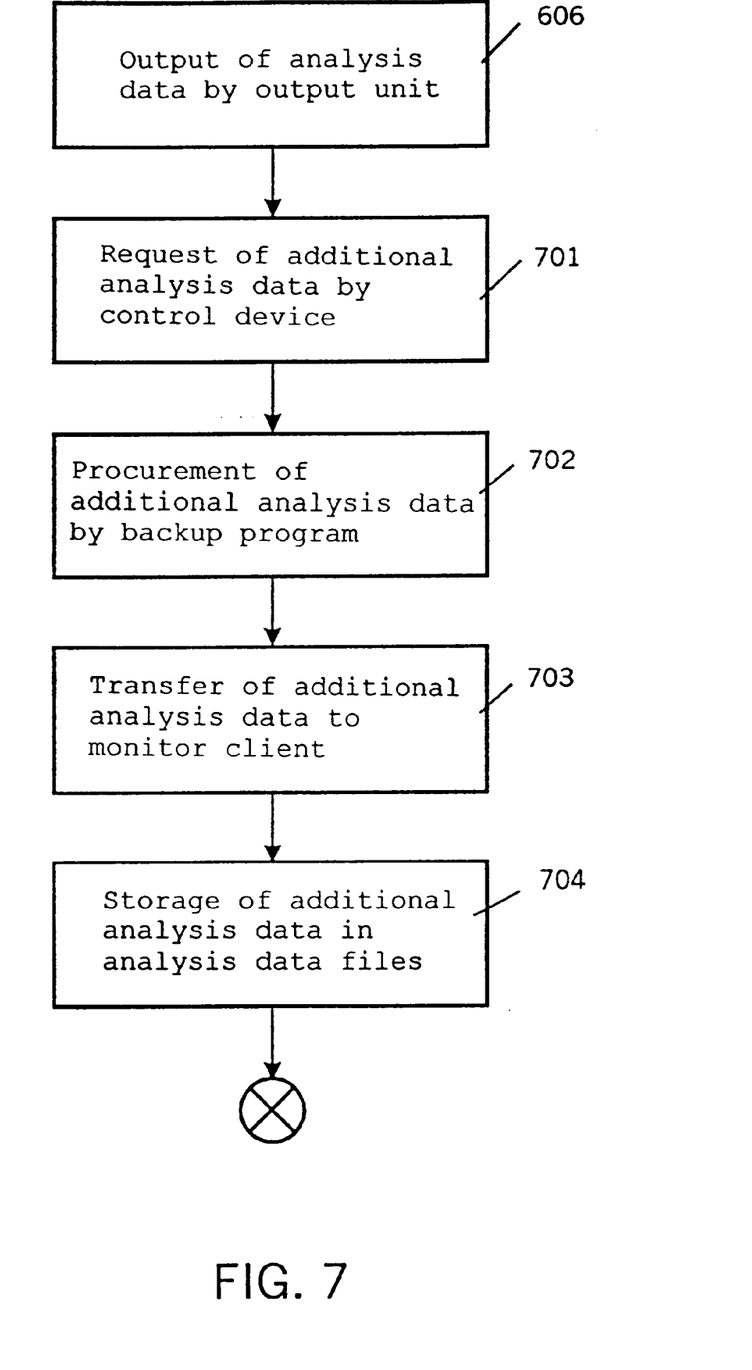
FIG. 7 shows the sequence of an expanded run monitoring process with additional analysis data.

As shown in FIG. 7, in step 701 additional analysis data are then requested by the control device 224 in the monitor client 220. The request uses the general information 302, 303, . . . on the backup operation from the memory 223 of the monitor client 220, including the names of the required files 107, 108, 115.

In a preferred embodiment of the invention in which the connection between the computer 101 and the computer 201 is held only for the duration of the backup operation, following the backup operation the log file 107, the trace file 108 and the backup log 115 are transferred by the backup program 105 to the monitor server 202, where they are stored in the analysis data file 203. The additional analysis data are subsequently delivered to the monitor client 220 on request by the monitor server 202, after being processed according to step 602 in FIG. 6.

The additional analysis data are displayed according to the settings made by the user—for example setting of the time of the irregularity by adjustment of the position slide control 901—after appropriate processing by the control device 224 in the monitor client 220. This embodiment of the invention has the advantage that a permanent connection between the test system 100 and the analysis system 200 is not necessary for a subsequent run analysis with review of additional analysis data.

In a further embodiment of the invention, in which the connection between the test system 100 and the analysis system 200 is a permanent connection 230 maintained independently of any backup operation, the request for the additional analysis data is forwarded from the monitor client 220 via the monitor server 202 to the backup program 105 on the test system 100. The backup program 105, which in this embodiment of the invention is permanently active, requests the data from the relevant files 107, 108, 115 in step 702. For this, the device 211 for delivery of analysis data in the backup program 105 has been enhanced to include the appropriate functionality. Then the backup program 105 transfers the additional analysis data to the monitor server 202 in step 703. In this process, the entire contents of the files 107, 108, 115 are preferably transferred. Then, in step 704, the additional analysis data are stored in the analysis data file 203 and then, as described in steps 602 to 606 in FIG. 6, are processed and transferred to the monitor client 220 for output, as shown in FIG. 10. The additional analysis data are again displayed, based on the settings made by the user after processing of the analysis data, by the control device 224.

Just as additional analysis data can be requested during the subsequent review of analysis data, the same request can be made in review of the analysis data during the backup operation following step 505 in FIG. 5. Since the log file 107, the trace file 108 and the backup log 115 are generated virtually in time with the progression of the backup operation, their contents can also be transferred during the backup operation to the analysis system 200. The additional analysis data are requested during the backup operation in the same way as in subsequent review by the monitor client 220 by way of the monitor server 202 and the backup program 105, wherein after step 505 the steps 701 to 704 are executed, followed by steps 503 to 505.

What is claimed is:

1. A system for monitoring a process being performed in a digital computer, said system comprising:

a monitor server for receiving process analysis data through a logical connection to the digital computer performing the process being monitored;

a memory for storing process analysis data received through said monitor server;

a memory control logic for retrieving process analysis data previously stored in said memory;

data manipulation logic for manipulating the retrieved process analysis data; and an output device for presenting the manipulated process analysis data.

2. A system as set forth in claim 1 wherein said system is a computer system which can operate independently of the system containing the digital computer performing the process being monitored.

3. A system as set forth in claim 2 further including data presentation logic for causing said output device to present manipulated process analysis data in a sequence and at a rate selectable by a user.

4. A system as set forth in any one of claims 1–3 wherein the output device comprises a display having a graphical user interface.

* * * * *